(12) United States Patent
Roering

(10) Patent No.: US 9,045,229 B2
(45) Date of Patent: Jun. 2, 2015

(54) SEALING SYSTEM

(75) Inventor: Sebastian Roering, Hamburg (DE)

(73) Assignee: AIRBUS OPERATIONS GMBH, Hamburg (DE)

(*) Notice: Subject to any disclaimer, the term of this patent is extended or adjusted under 35 U.S.C. 154(b) by 0 days.

(21) Appl. No.: 13/189,039

(22) Filed: Jul. 22, 2011

(65) Prior Publication Data

US 2012/0025679 A1 Feb. 2, 2012

Related U.S. Application Data

(60) Provisional application No. 61/366,595, filed on Jul. 22, 2010.

(30) Foreign Application Priority Data

Jul. 22, 2010 (DE) .......................... 10 2010 031 909

(51) Int. Cl.
| | | |
|---|---|---|
| A47B 96/04 | (2006.01) | |
| A47B 95/00 | (2006.01) | |
| A47B 96/00 | (2006.01) | |
| A61G 11/00 | (2006.01) | |
| F16J 15/46 | (2006.01) | |
| B64D 11/00 | (2006.01) | |
| B64D 13/00 | (2006.01) | |

(Continued)

(52) U.S. Cl.
CPC .......... B64D 11/0007 (2013.01); *F25D 19/003* (2013.01); *E06B 7/2318* (2013.01); *B64D 11/04* (2013.01); *B64D 2013/0629* (2013.01); *F16J 15/46* (2013.01)

(58) Field of Classification Search
USPC ................ 312/296, 405, 1; 244/118.5, 129.4, 244/129.5; 52/2.14; 62/237; 277/605, 277/645–646; 296/24.35; 49/475.1, 477.1, 49/483.1
See application file for complete search history.

(56) References Cited

U.S. PATENT DOCUMENTS 2,778,206 A * 1/1957 Wilson et al. ...................... 62/62
3,371,986 A * 3/1968 Brown ........................... 422/118

(Continued)

FOREIGN PATENT DOCUMENTS

| DE | 41 05 034 A1 | 8/1992 | |
|---|---|---|---|
| DE | 43 40 317 A1 | 6/1995 | |
| WO | WO 2008070835 A1 * | 6/2008 | ............. B64D 11/00 |

OTHER PUBLICATIONS

English Language Abstract of German Patent No. DE 43 40 317 A1.

(Continued)

*Primary Examiner* — Daniel J Troy
*Assistant Examiner* — Andrew Roersma
(74) *Attorney, Agent, or Firm* — Kreig DeVault LLP

(57) ABSTRACT

A sealing system (38) for use in an aircraft facility to be sealed from the environment comprises a closing element (40) which can be connected to a housing (42) of the aircraft facility in order to seal an opening (44) formed in the housing (42) of the aircraft facility. Furthermore, the sealing system (38) comprises a receiving device (46), and a sealing element (48) received in the receiving device (46). A transfer device (54) is adapted to transfer the sealing element (48) between an inactive state, in which the sealing element (48) is shaped and/or positioned such that it cannot be brought into sealing contact with a sealing surface (64), and an active state, in which the sealing element (48) is shaped and/or positioned such that it can be brought into sealing contact with the sealing surface (64).

10 Claims, 5 Drawing Sheets

Figure 1:
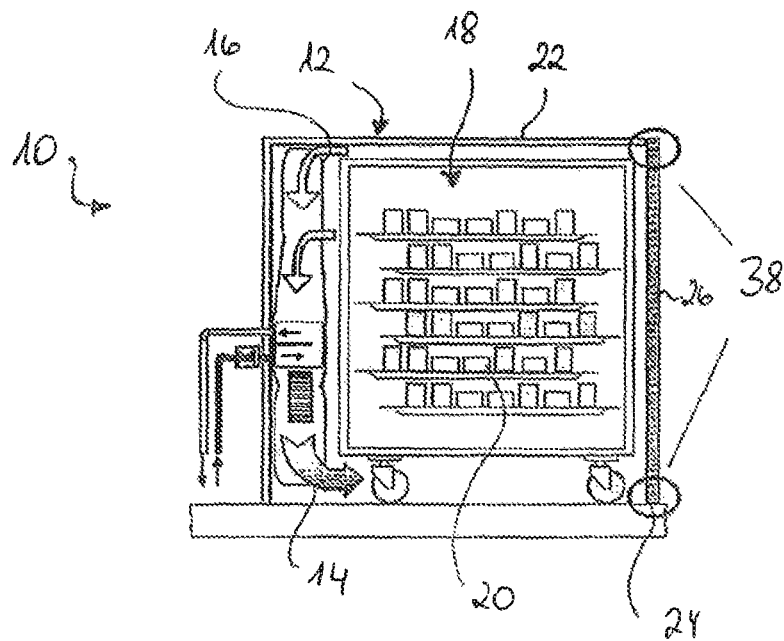

(51) Int. Cl.
*B64C 1/14* (2006.01)
*E06B 7/23* (2006.01)
*F25D 19/00* (2006.01)
*B64D 11/04* (2006.01)
*B64D 13/06* (2006.01)

(56) References Cited

U.S. PATENT DOCUMENTS

| | | | | |
|---|---|---|---|---|
| 3,591,963 | A | * | 7/1971 | Kopp ............................... 60/801 |
| 3,598,416 | A | * | 8/1971 | Stock et al. ................... 277/320 |
| 3,694,962 | A | * | 10/1972 | McDonald et al. .......... 49/477.1 |
| 3,769,750 | A | * | 11/1973 | Mayer et al. ................. 49/477.1 |
| 4,073,521 | A | * | 2/1978 | Mena ....................... 292/256.65 |
| 4,323,110 | A | * | 4/1982 | Rubbright et al. ............ 165/267 |
| 4,579,192 | A | * | 4/1986 | Mueller ........................ 277/312 |
| 4,624,426 | A | | 11/1986 | Muscatell |
| 4,969,509 | A | * | 11/1990 | Merensky ........................ 165/41 |
| 5,562,406 | A | * | 10/1996 | Ooka et al. ..................... 415/112 |
| 5,655,595 | A | * | 8/1997 | Westbrooks, Jr. ............. 165/48.1 |
| 6,145,888 | A | * | 11/2000 | Ohmi et al. ...................... 285/93 |
| 6,698,439 | B2 | * | 3/2004 | Kamikawa et al. ............ 134/138 |
| 7,137,264 | B2 | * | 11/2006 | Simadiris et al. ................ 62/185 |
| 2004/0159742 | A1 | | 8/2004 | Wood et al. |
| 2006/0182534 | A1 | * | 8/2006 | Hiroki ........................... 414/217 |
| 2007/0278187 | A1 | * | 12/2007 | Siebens et al. ................. 218/118 |
| 2008/0001031 | A1 | * | 1/2008 | Doebertin et al. .......... 244/118.1 |
| 2008/0009184 | A1 | * | 1/2008 | Zahnen et al. ................. 439/577 |

OTHER PUBLICATIONS

English Language Abstract of German Patent No. DE 41 05 034 A1.

* cited by examiner

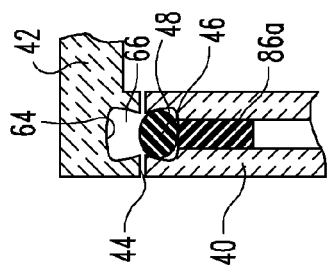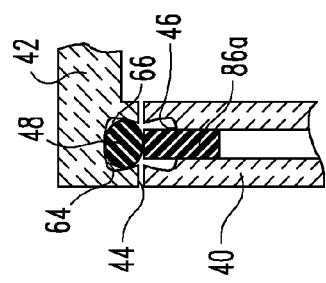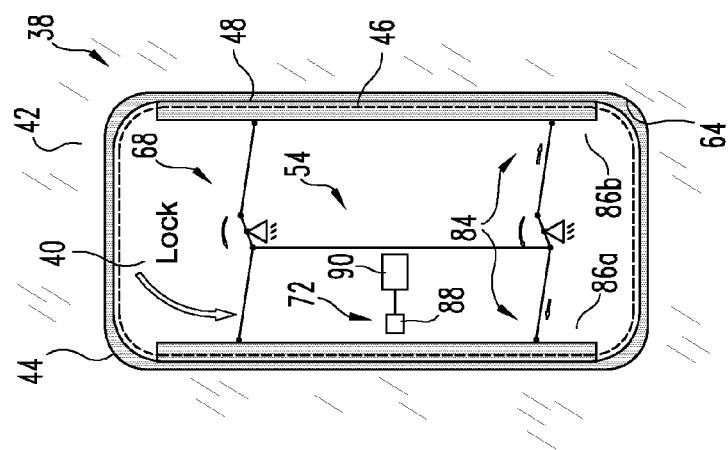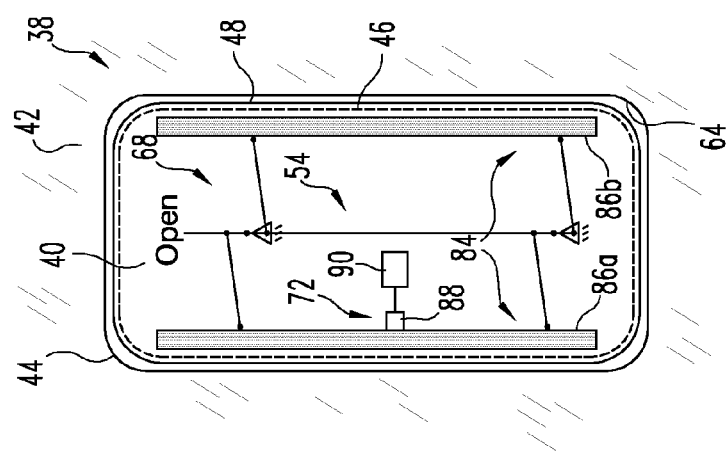

SEALING SYSTEM

CROSS REFERENCE TO RELATED APPLICATIONS

The present application claims the benefit of U.S. Provisional Application No. 61/366,595, filed on Jul. 22, 2010 and also claims priority to German Patent Application No. 10 2010 031 909.0, filed Jul. 22, 2010, each of which is incorporated herein by reference.

The invention relates to a sealing system suitable for use in an aircraft facility to be sealed from the environment and to an aircraft facility equipped with such a sealing system.

At present, in modern passenger aircraft, meals and beverages provided for supplying to the aircraft passengers during a flight are stored in trolleys or appropriately equipped storage cabinets in the region of galleys until they are delivered to the aircraft passengers by the cabin crew. In order to keep the meals and beverages cool until they are consumed, it is known to cool the trolleys or the storage cabinets provided in the region of the galleys of the aircraft with the aid of dry ice. This involves placing carbon dioxide snow compressed into block form in a compartment located at the top of a trolley to be cooled or a storage cabinet to be cooled, so that goods stored in the trolley or the storage cabinet are cooled with the aid of carbon dioxide gas which forms by sublimation and descends driven by gravity. The cooling with dry ice enables autonomous cooling of the goods held in the trolley or the storage cabinet, for which no additional fittings are required in the region of the galleys or in other aircraft regions. However, the cooling capacity of dry ice cooling is limited by the available dry ice volume. A further disadvantage of dry ice cooling is the lack of possibility to influence the temperature distribution arising in the trolley to be cooled or the storage cabinet to be cooled. Finally, the production of dry ice requires a great deal of energy and is therefore expensive.

In addition, it is known, for example from DE 41 05 034 A1, to cool trolleys, placed in the region of the galleys of the aircraft and used to store food to be kept cool, with the aid of autonomous cooling devices which work with cold air as the cooling medium and are each equipped with their own compression refrigerating machine (air chiller). Alternatively to this, DE 43 40 317 C2, for example, describes a central compression refrigerating machine whose refrigerating capacity is distributed via a refrigerant liquid circuit to cooling stations arranged in the region of the aircraft galleys. The cooling stations supplied with cooling energy by the central refrigerating machine release this cooling energy to trolleys placed in the region of the galleys of the aircraft and used to store food which is to be kept cool, via cooling air circuits which are thermally coupled to the liquid refrigerant circuit via corresponding heat exchangers.

Irrespective of whether the cooling energy required for cooling the food to be kept cool is provided by an autonomously working air chiller or a central liquid cooling system of the aircraft, two different systems for supplying cooling air to the food to be cooled can be used. So-called air-over systems comprise a heat-insulated cooling chamber sealed against leaks, through which flows cooling air provided by the air chiller or the central liquid cooling system. The trolleys loaded with the food to be cooled can be pushed into the cooling chamber. Trolleys suitable for use in an air-over system are not insulated themselves, but rather have air openings which allow unhindered circulation of cooling air from the cooling chamber through the trolleys and consequently over the food held in the trolleys which is to be cooled. By contrast, in so-called air-through systems, the trolleys are connected to the air chiller or a cooling station of the central liquid cooling system via corresponding cooling air connections provided on the trolleys, so that the cooling air provided by the air chiller or the central liquid cooling system can be passed directly through the trolleys. To avoid losses of cooling energy, trolleys provided for use in an air-through system must be provided with heat insulation and be sealed against leaks.

Cooling chambers and trolleys currently employed in modern commercial aircraft are usually equipped with seals configured in the form of brush seals, elastomer seals, lamellar seals or elastomer compression seals. However, seals arranged in particular in the region of the doors of the cooling chambers and trolleys are subject to operationally related wear. Moreover, in the operation of the cooling chambers and trolleys, tolerances caused by deformations and wear phenomena in the region of the doors arise which cannot be compensated for by the seals. Since defective or worn seals are often not immediately detected by the maintenance crew and cabin crew, the case may arise where a considerable part of the cooling energy to be provided by the air chiller or the central liquid cooling system must be expended to compensate for leakage losses. The air chiller or the central liquid cooling system must therefore be designed to be appropriately powerful, which has an adverse effect on the installation space volume and the weight of the air chiller or the liquid cooling system. Moreover, cold leakage air escaping from a cooling chamber or a trolley may impair the air conditions in the region of the aircraft galleys in a way which is unpleasant especially for the cabin crew.

The object on which the invention is based is to provide a sealing system which is suitable for use in an aircraft facility to be sealed from the environment and enables minimisation of leakage losses. Furthermore, the invention is directed at the object of specifying an aircraft facility equipped with such a sealing system.

The sealing system according to the invention is suitable for use in an aircraft facility to be sealed from the environment and comprises a closing element which is connectable to a housing of the aircraft facility in order to seal an opening formed in the housing of the aircraft facility. The opening formed in the housing of the aircraft facility can be, for example, a door opening which is closable by means of a closing element configured in the form of a door. Furthermore, the opening formed in the housing of the aircraft facility can be a connecting opening, through which a fluid, for example cooling air, can be supplied into the housing of the aircraft facility or a fluid, for example exhaust air, can be discharged from the housing of the aircraft facility. The closing element of the sealing system can then be designed, for example, in the form of a connecting element connectable to the connecting opening. The connecting element can be shaped, for example, hollow-cylindrically and have a fluid passage opening which can be connected in a fluid-conveying manner to a cooling air supply line or an exhaust air discharge line. A closing element which is suitable for sealing an opening formed in the housing of the aircraft facility is thus to be understood here to mean not only a closing element which, in its state connected to the housing of the aircraft facility, covers completely or substantially completely a cross-section, through which fluid can flow, of the opening formed in the housing of the aircraft facility. Rather, the closing element can also be a closing element which, in its state connected to the housing of the aircraft facility, sealingly connects the opening formed in the housing of the aircraft facility to a fluid line or the like.

Furthermore, the sealing system comprises a receiving device, in which a sealing element is received. The receiving device can be formed on the closing element, but also on the housing of the aircraft facility. For example, the receiving device can comprise a groove which extends along part of or the entire circumference of the closing element. Alternatively to this, it is also possible to envisage a receiving device with a groove which extends along part of or the entire circumference of the opening formed in the housing of the aircraft facility and is formed in the housing of the aircraft facility. The sealing element is preferably composed of an elastomer material suitable for producing sealing elements.

The sealing system according to the invention furthermore comprises a transfer device which is adapted to transfer the sealing element between an inactive state and an active state. In its inactive state, the sealing element is shaped and/or positioned such that it cannot be brought into sealing contact with a sealing surface. In contrast to this, in its active state, the sealing element is shaped and/or positioned such that it can be brought into sealing contact with the sealing surface. Depending on whether the receiving device is formed on the closing element or the housing of the aircraft facility, the sealing surface, with which the sealing element in its active state can be brought into sealing contact, can be formed on the housing of the aircraft facility or on the closing element. The sealing contact producible by the sealing element in its active state with the sealing surface can be a positive contact or a non-positive contact.

In an operating state of the sealing system in which the closing element does not have to sealingly close the opening formed in the housing of the aircraft facility, the transfer of the sealing element into its inactive state enables a very much better protection against wear than is achievable with conventional static sealing systems. As a result, the sealing system according to the invention enables minimisation of leaks due to wear. When the sealing system according to the invention is used in an aircraft facility to be cooled, for example a cooling chamber or a trolley, the cooling capacity to be provided by a corresponding cooling energy generating system can thus be reduced. The cooling energy generating system can therefore be designed to be less powerful and consequently more compact and lighter. Furthermore, a reduction of the electric power consumption of the cooling energy generating system is possible. Finally, through the minimisation of leaks, impairment of the air conditions in the environment of the aircraft facility sealed from the environment by means of the sealing system according to the invention is also minimised.

The sealing element of the sealing system according to the invention can comprise a fluid inlet and a fluid chamber connected to the fluid inlet. A fluid can be supplied into the fluid chamber when the sealing element is transferred from its inactive state into its active state. The fluid to be supplied into the fluid chamber of the sealing element can be a gas, but also a liquid, for example a hydraulic liquid. Preferably, however, the fluid to be supplied into the fluid chamber of the sealing element is air, i.e. the sealing element of the sealing system according to the invention is designed as an inflatable sealing element.

A sealing element with a fluid chamber which is filled with fluid only in the active state of the sealing element is particularly wear-resistant, since the sealing element not only has a smaller volume in its inactive state and consequently does not project or projects only slightly beyond a receiving device configured, for example, in the form of a groove, but also is subjected to a specific fluid pressure by the fluid in the fluid chamber only in its active state. A further advantage of a sealing element equipped with a fluid inlet and a fluid chamber is that the fluid pressure and/or the fluid volume in the fluid chamber in the active state of the sealing element can be varied, i.e. the fluid chamber of the sealing element can be subjected to different fluid pressures or filled with different fluid volumes according to requirements. For example, the fluid chamber can be subjected to a higher fluid pressure or filled with a greater fluid volume when it is necessary, in order to achieve a desired sealing action, to compensate for material abrasion of the sealing element due to wear or for tolerances due to deformations or wear phenomena in the region of the closing element or the housing of the aircraft facility. Designing the sealing element with a fluid inlet and a fluid chamber thus enables further minimisation of leaks.

A transfer device suitable in particular in conjunction with a sealing element comprising a fluid inlet and a fluid chamber can be equipped with a conveying device which is adapted to supply fluid into the fluid chamber of the sealing element or discharge fluid from the fluid chamber of the sealing element when the sealing element is transferred between its inactive state and its active state. The conveying device can withdraw the fluid, to be supplied to the fluid chamber of the sealing element when the sealing element is transferred from its inactive state into its active state, from a fluid reservoir. Such a configuration of the transfer device is suitable particularly when the fluid is a liquid, for example a hydraulic liquid. When the sealing element is transferred from its active state into its inactive state, the fluid can then be conveyed in turn back into the fluid reservoir by means of the conveying device or flow back into the fluid reservoir, for example, driven by gravity.

Alternatively to this, however, the conveying device can also withdraw the fluid, to be supplied to the fluid chamber of the sealing element when the sealing element is transferred from its inactive state into its active state, directly from the environment. Such a configuration of the transfer device is advantageously usable particularly in conjunction with an inflatable sealing element, in which the conveying device can convey air from the environment into the fluid chamber of the sealing element. When the sealing element is transferred from its active state into its inactive state, the air can be released from the fluid chamber without problems into the environment again.

The conveying device of the transfer device can have various configurations. For example, the conveying device can comprise a pump which can withdraw the fluid, to be supplied to the fluid chamber of the sealing element when the sealing element is transferred from its inactive state into its active state, from a fluid reservoir or the environment. For example, the pump can be controlled by means of a suitable control device such that the pump supplies fluid into the fluid chamber of the sealing element when the sealing element is transferred from its inactive state into its active state until a desired fluid pressure has built up in the fluid chamber of the sealing element or the sealing element has a desired volume owing to the supply of a desired fluid volume into the fluid chamber of the sealing element. To maintain the desired pressure in the fluid chamber of the sealing element, it is possible to use a valve which is associated with the pump or arranged in a connecting line between the pump and the fluid chamber of the sealing element and which interrupts the fluid communication between the pump and the fluid chamber of the sealing element as soon as the desired fluid pressure is reached or the desired fluid volume is present in the fluid chamber of the sealing element. Continued operation of the pump is then no longer necessary.

To transfer the sealing element from its active state into its inactive state, the valve can be opened, so that the fluid can be discharged from the fluid chamber of the sealing element into the environment or the fluid reservoir. In principle, the fluid pressure in the fluid chamber of the sealing element is sufficient to convey the fluid from the fluid chamber of the sealing element back into the environment or the fluid reservoir when the sealing element is transferred from its active state into its inactive state. If desired or required, however, the fluid discharge from the fluid chamber of the sealing element when the sealing element is transferred from its active state into its inactive state can also be assisted or completely taken over by an appropriate operation of the pump.

In an alternative configuration, the conveying device can comprise a preferably compressible fluid reservoir configured in the form of bellows and a spring element. The spring element can then preferably be coupled to the compressible fluid reservoir in order to apply a spring force to the fluid reservoir and thereby supply fluid from the fluid reservoir into the fluid chamber of the sealing element. In other words, in such a configuration of the conveying device, the spring can be coupled to the compressible fluid reservoir for conveying the sealing element from its inactive state into its active state, so that fluid is displaced from the fluid reservoir into the fluid chamber of the sealing element by the spring force acting on the fluid reservoir. By appropriate design of the spring, i.e. by appropriate choice of the spring force of the spring and by appropriate design of the compressible fluid reservoir, the fluid pressure to which the fluid chamber of the sealing element is subjected in the active state of the sealing element is determined.

As long as the spring force of the spring element acts on the compressible fluid reservoir, this spring force alone prevents a backflow of the fluid from the fluid chamber of the sealing element into the fluid reservoir. If desired, however, it is also possible additionally to provide a valve in the region of the fluid reservoir or of a connecting line connecting the fluid reservoir to the fluid chamber of the sealing element which interrupts the fluid communication between the fluid reservoir and the fluid chamber of the sealing element as soon as a desired fluid pressure prevails in the fluid chamber of the sealing element. In order to return the sealing element from its active state into its inactive state again, the spring element can be uncoupled from the compressible fluid reservoir, so that the spring force of the spring element no longer acts on the fluid reservoir. Moreover, if present, the valve associated with the fluid reservoir or arranged in the connecting line between the fluid reservoir and the fluid chamber of the sealing element can be opened. Consequently, there results a backflow of fluid from the fluid chamber of the sealing element into the fluid reservoir induced by the fluid pressure in the fluid chamber of the sealing element.

The transfer device of the sealing system according to the invention can furthermore comprise a positioning device which is movable relative to the receiving device. The positioning device, which can be part of the closing element or the housing of the aircraft facility, is preferably adapted to position the sealing element in different positions in the receiving device when the sealing element is transferred between its inactive state and its active state. In other words, the positioning device ensures that, in the operation of the sealing system according to the invention, the sealing element in its inactive state is arranged such that it is not in engagement with the sealing surface. In contrast to this, the positioning device positions the sealing element in its active state in such a manner that it is in sealing contact with the sealing surface in the operation of the sealing system according to the invention.

A transfer device equipped with a positioning device can be used in combination with a sealing element comprising a fluid inlet and a fluid chamber. The transfer device then preferably comprises also an above-described conveying device which is adapted to supply fluid into the fluid chamber of the sealing element or discharge fluid from the fluid chamber of the sealing element when the sealing element is transferred between its inactive state and its active state. Alternatively to this, however, a transfer device formed with a positioning device can also be used in association with a conventional sealing element, i.e. a sealing element not provided with a fluid inlet and a fluid chamber or a sealing element with a fluid-filled but sealed fluid chamber, i.e. not provided with a fluid inlet.

The positioning device can comprise a bearing element for supporting the sealing element. The bearing element of the positioning device can be provided to bear the sealing element movably relative to the receiving device. For transferring the sealing element from its inactive state into its active state, the bearing element with the sealing element borne thereon is preferably displaceable relative to the receiving device in the direction of the sealing surface. By contrast, for transferring the sealing element from its active state into its inactive state, the bearing element with the sealing element borne thereon is preferably displaceable relative to the receiving device in the direction facing away from the sealing surface. The bearing element can extend over part of or the entire receiving device. Depending on the design of the bearing element, only certain regions of the sealing element or the entire sealing element are then moved when the sealing element is transferred between its inactive state and its active state relative to the receiving device.

The transfer device of the sealing system according to the invention is preferably coupled to a locking mechanism, which can be associated with the closing element or the housing of the aircraft facility, in such a manner that the transfer device automatically transfers the sealing element between its inactive state and its active state depending on the position of the locking mechanism. In particular, the transfer device transfers the sealing element preferably automatically from its inactive state into its active state when the locking mechanism is in its locked position, in which it latches the closing element, in its state connected to the housing of the aircraft facility, in the housing of the aircraft facility. In contrast to this, the transfer device transfers the sealing element preferably automatically from its active state into its inactive state when the locking mechanism is in an open position, in which it unlatches the closing element, in its state connected to the housing of the aircraft facility, from the housing of the aircraft facility. An automatic coupling of the transfer device to a locking mechanism ensures that the sealing element is always in its active state when the closing element is latched in the housing of the aircraft facility and consequently a sealing function of the sealing element is desired.

The sealing system according to the invention preferably furthermore comprises an operating indicator which is adapted to indicate the operating state of the sealing system to a user. In particular, the operating indicator is adapted to indicate to a user whether the sealing element, the transfer device and/or a component of the transfer device is in an operable state or not. The operating indicator preferably comprises a warning signal emitting device which is adapted to emit a visible or audible warning signal if the operability of the sealing system is limited. The operating indicator enables monitoring of the operating state of the sealing system by the maintenance crew or the cabin crew. As a result, malfunctions of the sealing system can be detected more quickly and leaks repaired more quickly.

The operating indicator can have various designs. For example, the operating indicator can comprise at least one pressure sensor for sensing the pressure in the fluid chamber of the sealing element and/or in the fluid reservoir of the conveying device, and a pressure indicator accessible to a user. In such a configuration of the operating indicator, it is possible for the maintenance crew or the cabin crew to monitor that a sufficient pressure always prevails in the fluid chamber of the sealing element and/or in the fluid reservoir of the conveying device and consequently the sealing element can apply an appropriate sealing pressure to the sealing surface. Alternatively or additionally to this, the operating indicator can comprise at least one position sensor for sensing the position of the sealing element and/or the bearing element of the positioning device, and a position indicator accessible to a user. An operating indicator of such a configuration enables the maintenance crew or the cabin crew to monitor whether the sealing element in its active state is in a desired position in which the sealing element is in the desired sealing contact with the sealing surface. Finally, a configuration of the operating indicator with a viewing window is conceivable which affords a user visual contact with the sealing element, the fluid reservoir of the conveying device and/or the bearing element of the positioning device for the purpose of checking the operating state of the sealing element, the fluid reservoir of the conveying device and/or the bearing element of the positioning device. Such a configuration of the operating indicator can be realised particularly simply and enables reliable checking of the operation of the components of the sealing system.

An aircraft facility according to the invention comprises a housing, in which an opening is formed. An above-described sealing system seals the housing of the aircraft facility from the environment. The aircraft facility is preferably an aircraft facility to be cooled, in particular a cooling chamber or a trolley. The aircraft facility to be cooled can be connectable to a cooling energy generating device in the form of an air chiller or a cooling energy generating device in the form of a central liquid cooling system. Furthermore, the aircraft facility can be provided for integration in an air-over system or for integration in an air-through system.

In principle, only one opening formed in the housing of the aircraft facility, preferably a door opening, can be sealed by means of the sealing system according to the invention. Preferably, however, all the openings formed in the housing of the aircraft facility can be sealed by means of a sealing system according to the invention. For example, in an air-over system, the door opening of the cooling chamber can be sealed by means of a sealing system according to the invention. In the case of a trolley suitable for use in an air-through system, the door opening of the trolley can be sealed by means of a sealing system according to the invention. Furthermore, it is possible to utilise the sealing system according to the invention for sealing connecting openings formed in the trolley and serving to supply cooling air into the interior of the trolley or discharge exhaust air from the interior of the trolley, and in this case only some or all of the connecting openings of the trolley can be sealed by means of a sealing system according to the invention.

Although the sealing system according to the invention has been explained here essentially in association with an aircraft facility to be cooled, in particular a cooling chamber or a trolley, the sealing system according to the invention can also be used in other aircraft facilities, for example aircraft facilities to be heated or aircraft facilities to be sealed liquid-tightly.

Figure 2:
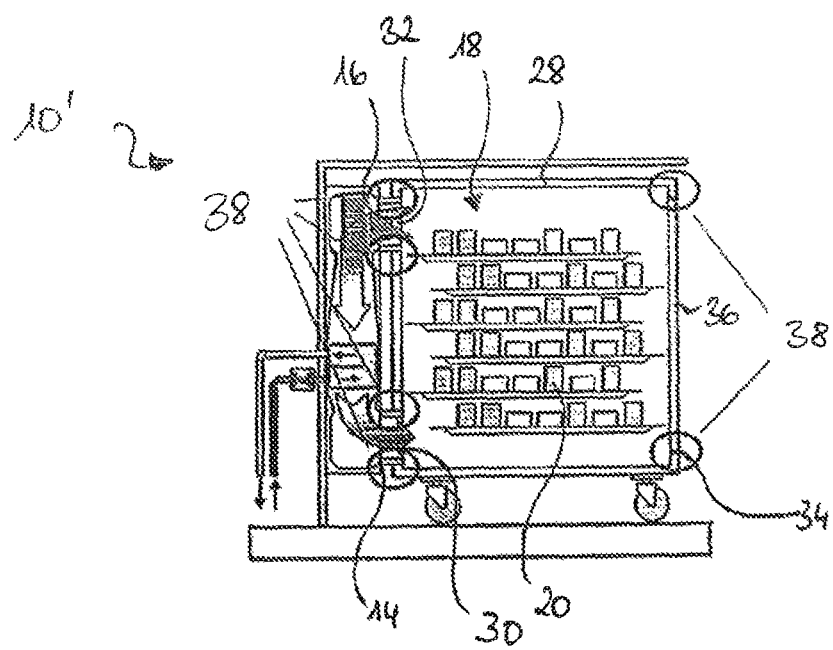
Figure 3B:
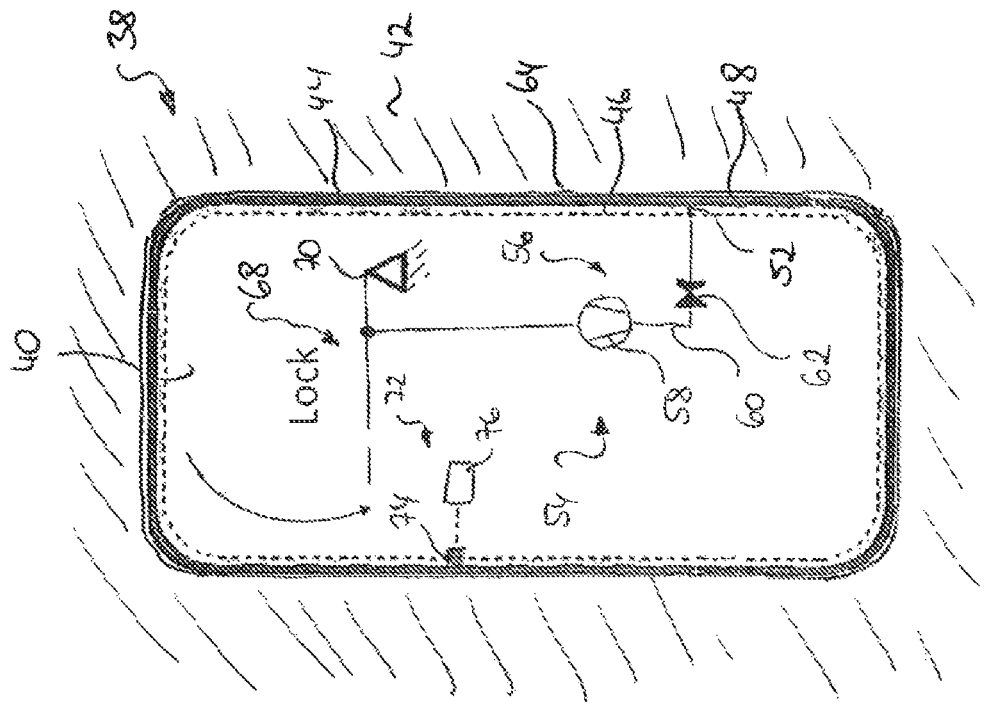
Figure 4A:
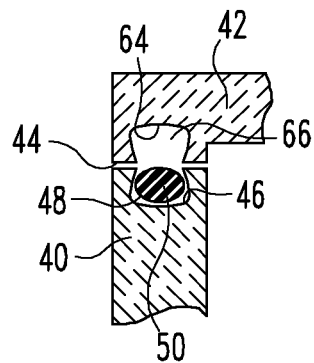
Figure 4B:
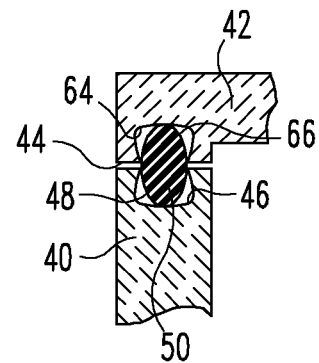
Figure 5A:
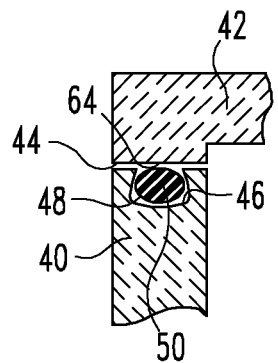
Figure 5B:
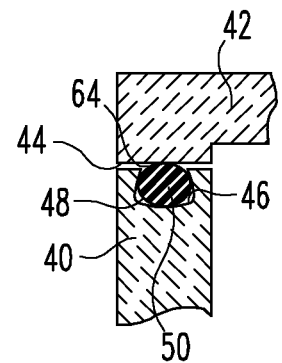
Figure 6C:
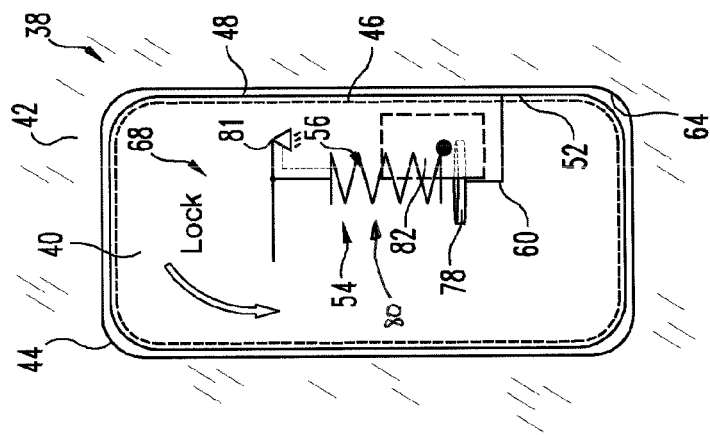
Figure 6B:
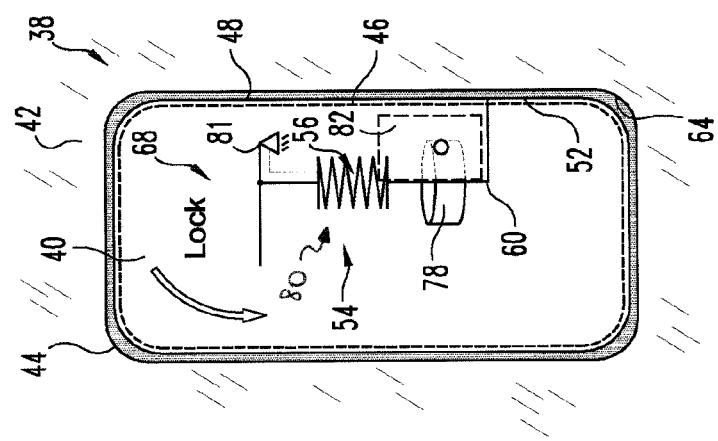
Figure 6A:
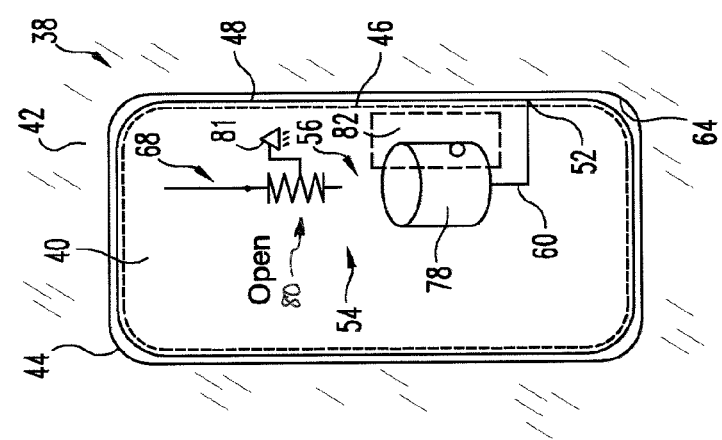

A preferred embodiment of the invention will now be explained in more detail with reference to the appended schematic drawings, of which FIG. 1 shows an air-over cooling system with a cooling chamber and a trolley arranged in the cooling chamber, FIG. 2 shows an air-through cooling system with a trolley through which cooling air can flow, FIGS. 3a and b show a first embodiment of a sealing system usable in a cooling chamber according to FIG. 1 or a trolley according to FIG. 2, a sealing element of the sealing system being in an inactive state in FIG. 3a and in an active state in FIG. 3b, FIGS. 4a and b show a first embodiment of a sealing element usable in the sealing system according to FIGS. 3a and b, the sealing element being in an inactive state in FIG. 4a and in an active state in FIG. 4b, FIGS. 5a and b show a second embodiment of a sealing element usable in the sealing system according to FIGS. 3a and b, the sealing element being in an inactive state in FIG. 5a and in an active state in FIG. 5b, FIGS. 6a to c show a second embodiment of a sealing system usable for use in a cooling chamber according to FIG. 1 or a trolley according to FIG. 2, a sealing element of the sealing system being in an inactive state in FIG. 6a and in an active state in FIG. 6b, and FIG. 6c illustrating a defective operating state of the sealing system, FIGS. 7a and b show a third embodiment of a sealing system usable in a cooling chamber according to FIG. 1 or a trolley according to FIG. 2, a sealing element of the sealing system being in an inactive state in FIG. 7a and in an active state in FIG. 7b, and FIGS. 8a and 8b show a detail illustration of the sealing element and a positioning device of the sealing system according to FIGS. 7a and b, the sealing element being in its inactive state in FIG. 8a and in its active state in FIG. 8b.

FIG. 1 shows an air-over cooling system 10 provided for use in the region of an aircraft galley and having a cooling chamber 12, into which cooling air is supplied via a cooling air outlet 14 in the operation of the air-over cooling system 10. The cooling energy for cooling the cooling air is provided by an air chiller (not illustrated specifically in FIG. 1) or a central liquid cooling system of the aircraft. Exhaust air heated as it flows through the cooling chamber 12 is discharged from the cooling chamber 12 via an exhaust air outlet 16. A trolley 18, which is loaded with food 20 to be kept cool and to be delivered to the passengers on board the aircraft, is located in the cooling chamber 12. The trolley 18 can be brought into the cooling chamber 12 through a door opening 24 formed in a housing 22 of the cooling chamber 12. The door opening 24 can be closed by means of a door 26. In order to seal the cooling air-cooled interior of the cooling chamber 12 from the environment, the door opening 24 formed in the housing 22 of the cooling chamber 12 is sealed from the environment by means of a sealing system, explained in more detail below.

FIG. 2 shows an air-through cooling system 10' likewise provided for use in the region of an aircraft galley. In contrast to the air-over cooling system 10 according to FIG. 1, a cooling chamber 12 can be dispensed with in the air-through cooling system 10' according to FIG. 2. Instead, the trolley 18 can be connected directly to the cooling air outlet 14, i.e. cooling air which is provided by the air chiller or the central liquid cooling system of the aircraft is led directly into an interior of the trolley 18 via the cooling air outlet 14. The exhaust air heated as it flows through the trolley 18 is discharged from the trolley 18 via the exhaust air outlet 16 likewise connected directly to the trolley 18. In order to be able to supply air from the cooling air outlet 14 into the interior of the trolley 18, a first connecting opening 30 is formed in a housing 28 it trolley 18. A second connecting opening 32 formed in the housing 28 of the trolley 18 serves for discharging exhaust air from the interior of the trolley 18. The first and the second connecting opening 30, 32 are each sealed from the environment by means of a sealing system, described below. Furthermore, a door opening 34 which is closed by means of a door 36 is formed in the housing 28 of the trolley 18. The door opening 34 of the trolley 18 is also sealed from the environment by means of a sealing system, described below.

Figure 3A:
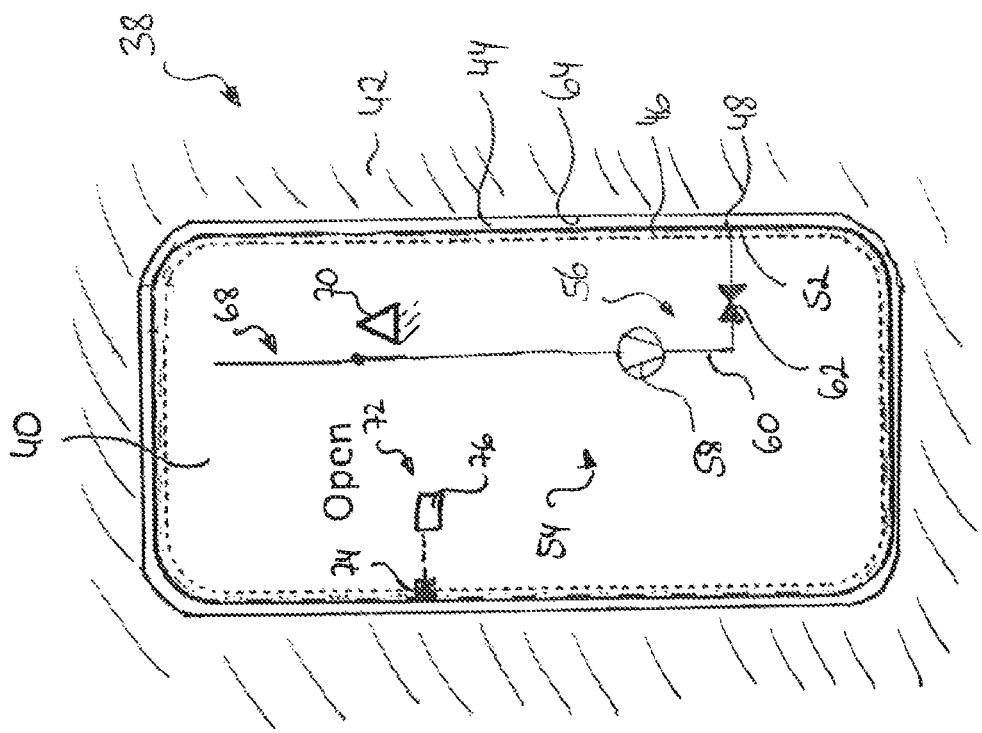

FIGS. 3*a* and *b* show a first embodiment of a sealing system 38 which can be used in the air-over cooling system 10 according to FIG. 1 for sealing the door opening 24 formed in the housing 22 of the cooling chamber 12. Equally, the sealing system 38 illustrated in FIGS. 3*a* and *b* is suitable in the first cooling system 10' according to FIG. 2 for sealing the door opening 34 formed in the housing 28 of the trolley 18. Furthermore, an appropriately modified sealing system can be used for sealing the connecting openings 30, 32 formed in the housing 28 of the trolley 18.

The sealing system 38 comprises a closing element 40 which is connected to a housing 42 of an aircraft facility, in the operational state of the sealing system 38 illustrated in FIGS. 3*a* and *b*, in order to close an opening 44 formed in the housing 42 of the aircraft facility. The aircraft facility can be a cooling chamber 12 of the air-over cooling system 10 illustrated in FIG. 1 or the trolley 18 of the air-through cooling system 10' according to FIG. 2. The closing element 40 can be formed by the door 26 of the cooling chamber 12 or the door 36 of the trolley 28. Accordingly, the opening 44 can be the door opening formed in the housing 22 of the cooling chamber 12 or the door opening 34 formed in the housing 28 of the trolley 18.

Alternatively to this, when the sealing system 38 is used in the air-through cooling system 10' according to FIG. 2, the closing element 40 can be formed by a hollow-cylindrical connecting element connected to the cooling air outlet 14 and which, although it allows cooling air to be supplied into the interior of the trolley 18, seals the first connecting opening 30 formed in the housing 28 of the trolley 18 from the environment. Similarly, the use of a closing element 40 configured in the form of a hollow-cylindrical connecting element for sealing the second connecting opening 32 formed in the housing 28 of the trolley 18 from the environment is conceivable.

A receiving device 46 configured in the form of a groove, in which an encircling sealing element 48 is received, extends around a circumference of the closing element 40. The sealing element 48 can be transferred between an inactive state illustrated in FIG. 3*a* and an active state shown in FIG. 3*b*. For this purpose, the sealing element 48 comprises an envelope composed of an elastomer material, which bounds a fluid chamber 50 formed in its interior (see FIGS. 4*a* and *b* as well as FIGS. 5*a* and *b*). A fluid can be supplied to the fluid chamber 50 via a fluid inlet 52 when the sealing element 48 is transferred from its inactive state into its active state. Correspondingly, fluid can pass out of the fluid chamber 50 via the fluid inlet 52 when the sealing element 48 is transferred from its active state into its inactive state.

A transfer device 54 for transferring the sealing element 48 between its inactive state and its active state comprises a conveying device 56 which supplies fluid into the fluid chamber 50 of the sealing element 48 when the sealing element 48 is transferred from its inactive state into its active state and discharges fluid from the fluid chamber 50 of the sealing element 48 when the sealing element 48 is transferred from its active state into its inactive state. In the embodiment according to FIGS. 3*a* and *b*, the conveying device 56 comprises a pump which pumps air from the environment into the fluid chamber 50 of the sealing element 48 as the fluid to be supplied into the fluid chamber 50 of the sealing element 48 for transferring the sealing element 48 from its inactive state into its active state. The pump 58 is connected to the fluid inlet 52 of the fluid chamber 50 of the sealing element 48 via a connecting line 60. The pump 58 pumps air from the environment into the fluid chamber 50 of the sealing element 48 until the pressure in the fluid chamber 50 has reached a predetermined value. When this predetermined pressure value is reached, a valve 62 arranged in the connecting line 60 closes and thus interrupts the fluid communication between the environment and the fluid chamber 50 of the sealing element 48. The pump 58 can then be switched off. By contrast, for transferring the sealing element 48 from its active state into its inactive state, all that is required is to open the valve 62. Air then flows from the fluid chamber 50 of the sealing element 48 through the open valve 62 back into the environment, driven by the pressure in the fluid chamber 50 of the sealing element 48.

As can be seen by a comparison of FIGS. 3*a* and 3*b*, the sealing element 48 in its inactive state, in which the fluid chamber 50 of the sealing element 48 is not filled with air, has a shape which prevents the sealing element 48 from being brought into sealing contact with a sealing surface 64 formed on the housing 42 of the aircraft facility. By contrast, in its active state the sealing element 48 is shaped by the air-filled fluid chamber 50 such that it is in sealing contact with the sealing surface 64 on the housing 42 of the aircraft facility and thus ensures reliable sealing of the opening 44 formed in the housing 42 of the aircraft facility from the environment.

By means of the inflatable sealing element 48, a positive (see FIGS. 4*a* and *b*) and a non-positive (see FIGS. 5*a* and *b*) sealing of the opening 44 formed in the housing 42 of the aircraft facility is possible. The sealing element 48 and the sealing surface 64 formed on the housing 42 of the aircraft facility can be appropriately shaped depending on whether a positive or a non-positive sealing of the opening 44 formed in the housing 42 of the aircraft facility is desired. For example, the sealing surface 64 can be provided with a recess 66, as shown in FIGS. 4*a* and *b*, which at least partly receives the sealing element 48 in its active state, which positively seals the opening 44 formed in the housing 42 of the aircraft facility.

In the sealing system 38 shown in FIGS. 3*a* and *b*, the transfer device 54 is coupled to a locking mechanism 68 of the closing element 40. When the locking mechanism 68 is in its open position illustrated in FIG. 3*a*, the closing element 40 is unlatched from the housing 42 of the aircraft facility, i.e. a closing element 40 configured for example in the form of a door can be pivoted relative to the housing 42 of the aircraft facility in order to free the opening 44 formed in the housing 42 of the aircraft facility. By contrast, in its locked position shown in FIG. 3*b*, the locking mechanism 68 latches the closing element 40 in the housing 42 of the aircraft facility.

The locking mechanism 68 is coupled to the transfer device 54 via an electrical contact 70. When the locking mechanism 68 is transferred from its open position into its locked position, the electrical contact 70 is activated. This has the effect that the pump 58 is started and air from the environment is pumped into the fluid chamber 50 of the sealing element 48. The pump 58 is automatically stopped when the pressure in the fluid chamber 50 of the sealing element 48 has reached a predetermined pressure value and the valve 62 is closed to maintain this pressure value. Alternatively to this, a mechanical coupling of the locking mechanism 68 to the transfer device 54 is also conceivable.

Furthermore, the sealing system 38 comprises an operating indicator 72 which serves to indicate the operating state of the sealing system 38 to a user. The operating indicator 72 comprises a pressure sensor 74 which senses the pressure in the fluid chamber 50 of the sealing element 48. An indicating device 76 indicates whether the pressure values measured by the pressure sensor 74 lie in a desired range.

The sealing system 38 shown in FIGS. 6a to c differs from the arrangement according to FIGS. 3a and b in the design of the transfer device 54. In particular, the conveying device 56 of the transfer device 54 no longer comprises a pump, but a compressible fluid reservoir 78 configured in the form of bellows, which is connected to the fluid chamber 50 of the sealing element 48 via the connecting line 60. A spring element 80 can be coupled to the fluid reservoir 78 in order to apply a spring force to the fluid reservoir 78 and thereby supply fluid, i.e. air, from the fluid reservoir 78 into the fluid chamber 50 of the sealing element 48. In particular, the spring element 80 is positioned and coupled to the locking mechanism 68 of the closing element 40 such that the spring element 80 automatically applies a spring force to the compressible fluid reservoir 78 when the locking mechanism 68 is in its locked position. When the locking mechanism 68 is moved into its open position, the spring element 80 is uncoupled again from the compressible fluid reservoir 78, so that the fluid reservoir 78 is no longer loaded by the spring force of the spring element 78. Consequently, the air can flow back from the fluid chamber 50 of the sealing element 48 into the fluid reservoir 78 again.

In the embodiment of the sealing system 38 shown in FIGS. 6a to c, the operating indicator 72 comprises a viewing window 82 which affords a user visual contact with the fluid reservoir 78. In particular, the viewing window 82 makes it possible to see if the spring element 80 compresses the fluid reservoir 78 further than is normally necessary to produce a desired pressure in the fluid chamber 50 of the sealing element 78. A user can thus immediately detect through the viewing window 82 whether the fluid reservoir 78 for the spring element 80 is excessively compressed (see FIG. 6c), for example owing to a leak of the sealing element 48 or the fluid reservoir 78.

The embodiment of a sealing system 38 shown in FIGS. 7a and b differs from the arrangement according to FIGS. 3a and 3b again in the design of the transfer device 54. In particular, the transfer device 54 of the sealing system 38 illustrated in FIGS. 7a and b comprises a positioning device 84 which is movable relative to the receiving device 46 and serves to position the sealing element 48 when it is transferred between its inactive state and its active state in different positions in the receiving device 46. The positioning device 84 comprises two bearing elements 86a, 86b which each extend along part of the circumference of the closing element 40. The bearing elements 86a, 86b each support a section of the sealing element 48. As can best be seen from FIGS. 8a and b, the bearing elements 86a, 86b can be displaced in the direction of the sealing surface 64 formed on the housing 42 of the aircraft facility, in order to transfer the sealing element 48 from its inactive state, in which the sealing element 48 is not in sealing contact with the sealing surface 64, into its active state, in which the sealing element 48 bears sealingly against the sealing surface 64. Similarly, a displacement of the bearing elements 86a, 86b relative to the receiving device 46 in the direction facing away from the sealing surface 64 brings about the transfer of the sealing element 48 from its active state into its inactive state.

The transfer device 54, i.e. the positioning device 84, is again coupled to the locking mechanism 68, i.e. the bearing elements 86a, 86b are automatically displaced into their position shown in FIGS. 7b and 8b when the locking mechanism 68 is moved from its open position into its locked position. Similarly, a movement of the locking mechanism 68 from its locked position into its open position brings about a displacement of the bearing elements 86a, 86b of the positioning device 84 into their position shown in FIGS. 7a and 8a.

An operating indicator 72 of the sealing system 38 comprises a position sensor 88 which senses the position of the bearing elements 86a, 86b and thus the sealing element 48. An indicating device 90 indicates whether the bearing elements 86a, 86b are in their desired position. Alternatively to this, the operating indicator can also comprise two viewing windows 82a, 82b which afford a user visual contact with the bearing elements 86a, 86b. The user can then detect through the viewing windows 82a, 82b whether the bearing elements 86a, 86b are in their desired position.

In the sealing system 38 shown in FIGS. 7a and b and also in FIGS. 8a and b, the sealing element 48 can be designed as a conventional solid-rubber sealing element, but also in the form of a fluid-filled sealed tube. Alternatively to this, however, the sealing element can also be equipped with a fluid chamber 50, as described above. Moreover, any desired combination of the features explained here in connection with individual embodiments of the sealing system 38 is conceivable. In particular, the discussed embodiments of the sealing element 48, the transfer device 54, the conveying device 56, the operating indicator 72 and the positioning device 84 can be exchanged as desired.

The invention claimed is:

1. Air-through cooling system for use in an aircraft galley which comprises:
    an aircraft cooling system comprising a cooling air outlet that provides cooling air from the aircraft cooling system,
    a trolley with a housing, in which a connecting opening is formed, wherein the connecting opening is directly connectable to the cooling air outlet and serves to supply cooling air into the interior of the trolley or to discharge exhaust air from the interior of the trolley, and wherein the connecting opening defines a sealing surface; and
    a sealing system including:
        a closing element which is releasably connectable to the connecting opening of the trolley in order to seal the connecting opening formed in the housing of the trolley from the environment and which has a fluid passage opening connected in a fluid conveying manner to the cooling air outlet of the aircraft cooling system,
        a receiving device comprising a groove in the closing element of the aircraft cooling system, the groove extending around the closing element,
        a sealing element received in the receiving device of the aircraft cooling system, and
        a transfer device which is adapted to transfer the sealing element of the aircraft cooling system between an inactive state, in which the sealing element is configured such that the sealing element cannot be brought into sealing contact with the sealing surface of the connecting opening of the trolley facing the receiving device, and an active state, in which the sealing element is configured such that the sealing element can be brought into sealing contact with the sealing surface of the connecting opening of the trolley facing the receiving device;

wherein the air-through cooling system is characterized in that the transfer device is coupled to a locking mechanism in such a manner that the transfer device transfers the sealing element automatically from the inactive state into the active state when the locking mechanism is in a locked position, in which the locking mechanism latches the closing element, when connected to the housing, in the housing, and that the transfer device transfers the sealing element automatically from the active state into the inactive state when the locking mechanism is in an open position, in which the locking mechanism unlatches the closing element when connected to the housing, from the housing.

2. Air-through cooling system according to claim 1, characterised in that the sealing element comprises a fluid inlet and a fluid chamber which is connected to the fluid inlet and into which a fluid is supplyable when the sealing element is transferred from its inactive state into its active state.

3. Air-through cooling system according to claim 2, characterised in that the transfer device comprises a conveying device which is adapted to supply fluid into the fluid chamber of the sealing element or discharge fluid from the fluid chamber of the sealing element when the sealing element is transferred between the inactive state and the active state.

4. Air-through cooling system according to claim 3, characterised in that the conveying device comprises a pump, a valve, a fluid reservoir and/or a spring element, the spring element being connectable in particular to the fluid reservoir in order to apply a spring force to the fluid reservoir and thereby supply fluid from the fluid reservoir into the fluid chamber of the sealing element.

5. Air-through cooling system according to claim 1, characterised in that the transfer device comprises a positioning device which is movable relative to the receiving device and which is adapted to position the sealing element in different positions in the receiving device when the sealing element is transferred between the inactive state and the active state.

6. Air-through cooling system according to claim 5, characterised in that the positioning device comprises a bearing element for supporting the sealing element, which is displaceable relative to the receiving device in the direction of the sealing surface for transferring the sealing element from the inactive state into the active state and which is displaceable relative to the receiving device in the direction facing away from the sealing surface for transferring the sealing element from the active state into the inactive state.

7. Air-through cooling system according to claim 1, characterized by an operating indicator which is adapted to indicate the operating state of the sealing system to a user.

8. Air-through cooling system according to claim 7, characterised in that the operating indicator comprises:
- at least one pressure sensor for sensing the pressure in a fluid chamber of the sealing element and/or in a fluid reservoir of a conveying device, and a pressure indicator accessible to a user, and/or
- at least one position sensor for sensing the position of the sealing element and/or a bearing element of the positioning device, and a position indicator accessible to a user, and/or
- a viewing window which affords a user visual contact with the sealing element, the fluid reservoir of the conveying device and/or the bearing element of the positioning device for the purpose of checking the operating state of the sealing element, the fluid reservoir of the conveying device and/or the bearing element of the positioning device.

9. Aircraft facility having:
an air-through cooling system according to claim 1, which seals the housing of the trolley from the environment.

10. The air-through cooling system of claim 1, wherein the closing element is in the form of a hollow-cylindrical connecting element carried by the cooling air outlet.

* * * * *